(12) United States Patent
Pines et al.

(10) Patent No.: US 10,447,961 B2
(45) Date of Patent: Oct. 15, 2019

(54) LUMINANCE MANAGEMENT FOR HIGH DYNAMIC RANGE DISPLAYS

(71) Applicant: THOMSON Licensing, Issy-les-Moulineaux (FR)

(72) Inventors: Joshua Pines, San Francisco, CA (US); Gregory S. Weaver, San Marino, CA (US)

(73) Assignee: INTERDIGITAL VC HOLDINGS, INC., Wilmington, DE (US)

(*) Notice: Subject to any disclaimer, the term of this patent is extended or adjusted under 35 U.S.C. 154(b) by 0 days.

(21) Appl. No.: 15/777,195

(22) PCT Filed: Nov. 18, 2015

(86) PCT No.: PCT/US2015/061322
§ 371 (c)(1),
(2) Date: May 17, 2018

(87) PCT Pub. No.: WO2017/086950
PCT Pub. Date: May 26, 2017

(65) Prior Publication Data
US 2018/0338104 A1   Nov. 22, 2018

(51) Int. Cl.
*H04N 5/58* (2006.01)
*G09G 5/00* (2006.01)
*H04N 21/44* (2011.01)

(52) U.S. Cl.
CPC ............ *H04N 5/58* (2013.01); *G09G 5/00* (2013.01); *H04N 21/44* (2013.01);
(Continued)

(58) Field of Classification Search
CPC ............ H04N 5/58; H04N 21/44; G09G 5/00; G09G 2320/0626; G09G 2320/103; G09G 2360/16
(Continued)

(56) References Cited

U.S. PATENT DOCUMENTS 6,002,443 A    12/1999  Iggulden
2002/0130966 A1  9/2002  Park
(Continued)

FOREIGN PATENT DOCUMENTS

EP       1310935      5/2003

OTHER PUBLICATIONS

Yeh et al., "TV Commercial Detection in News Program Videos", IEEE International Symposium on Circuits and Systems (ISCAS 2005) Kobe, Japan, May 23, 2005, pp. 1-4.

*Primary Examiner* — Michael Lee
(74) *Attorney, Agent, or Firm* — Brian J. Dorini; Patricia A. Verlangieri (57) ABSTRACT

Managing luminance of video streams for display on HDR displays is provided. The luminance values of frames of a video stream can be monitored, and an over-bright frame can be determined if a luminance increase greater than a given luminance change within a given period of time. When a brightness jump exceeding given parameters is detected, the luminance values of the over-bright frame can be reduced. For example, luminance values can be reduced by reducing the luminance values of the over-bright frame such that the change in the average luminance is brought below the given value, and the luminance values of the modified frame can maintain relative luminances among pixels. A modified frame can be determined from the over-bright frame based on the reduced luminance values. The modified frame can be inserted into the video stream and transmitted to an HDR display to be displayed.

21 Claims, 7 Drawing Sheets

(52) U.S. Cl.
CPC ............ *G09G 2320/0626* (2013.01); *G09G 2320/103* (2013.01); *G09G 2360/16* (2013.01)

(58) Field of Classification Search
USPC ........................................ 348/602
See application file for complete search history.

(56) References Cited

U.S. PATENT DOCUMENTS

| | | |
|---|---|---|
| 2003/0011716 A1 | 1/2003 | Vogel |
| 2015/0042890 A1 | 2/2015 | Messmer |
| 2016/0100183 A1* | 4/2016 | Yamamoto ............... H04N 5/76 386/230 |
| 2016/0142714 A1* | 5/2016 | Toma ................ H04N 21/4402 375/240.25 |

\* cited by examiner

LUMINANCE MANAGEMENT FOR HIGH DYNAMIC RANGE DISPLAYS

This application claims the benefit, under 35 U.S.C. § 365 of International Application PCT/US2015/061322, filed Nov. 18, 2015, which was published in accordance with PCT Article 21(2) on May 26, 2017, in English.

TECHNICAL FIELD

The present disclosure generally relates to displaying content on high dynamic range (HDR) displays and, more particularly, to managing luminance of video streams for displaying on HDR displays.

BACKGROUND

High dynamic range displays have the capability of producing brightness levels far beyond conventional, standard dynamic range displays. The maximum brightness of HDR displays can be 2 to 10 times as bright as standard dynamic range (SDR) displays. As a result, HDR displays have the capability to display scenes that are more realistic.

SUMMARY

Examples and details are provided herein of systems and methods for managing luminance of video streams for display on HDR displays. In various embodiments, the luminance values of the frames of a video stream can be monitored, and an over-bright frame can be determined if a luminance increase greater than a given luminance change within a given period of time. When a brightness jump exceeding the given parameters is detected, the luminance values of the over-bright frame can be reduced. For example, luminance values can be reduced based on the given luminance change by reducing the luminance values of the over-bright frame such that the change in the average luminance is brought below the given value, and the luminance values of the modified frame can maintain the relative luminances among pixels of the modified frame. A modified frame can be determined from the over-bright frame based on the reduced luminance values. The modified frame can be inserted into the video stream and transmitted to an HDR display to be displayed.

It should be understood that the drawings are for purposes of illustrating the concepts of the disclosure and are not necessarily the only possible configurations for illustrating the disclosure.

DETAILED DESCRIPTION

High dynamic range displays have the capability of producing brightness levels far beyond conventional, standard dynamic range displays. While the brightness levels capable of being produced by HDR displays are well below the level required to damage a human retina, large jumps in brightness output by HDR displays can cause significant discomfort or even pain. For example, a user may be watching a television program showing a night scene in which the HDR display is dark, and then the program may cut to a very bright commercial. This large jump in brightness may cause the user discomfort, similar to the experience of walking out of a dimly lit room into bright sunlight. In particular, the response time of the human eye, i.e., the amount of time required for the iris to constrict when exposed to a large brightness increase in a short time period, may not be fast enough to prevent discomfort. Unlike the discomfort of walking from dim light into sunlight, the discomfort of viewing brightness jumps on HDR displays may be exacerbated by the fast-paced nature of content consumption. For example, commercials are typically inserted at frequent intervals, multiple night-to-day scene cuts can occur in a single movie or TV program, users channel surf and switch channels between dark and bright content, bright on-screen menus may be accessed while watching dark content, etc. In other words, while the average person experiences dim light-into-sunlight discomfort only occasionally, the average HDR display viewer may experience frequent and repetitive brightness jumps that may cause discomfort, fatigue, or pain.

Figure 1:
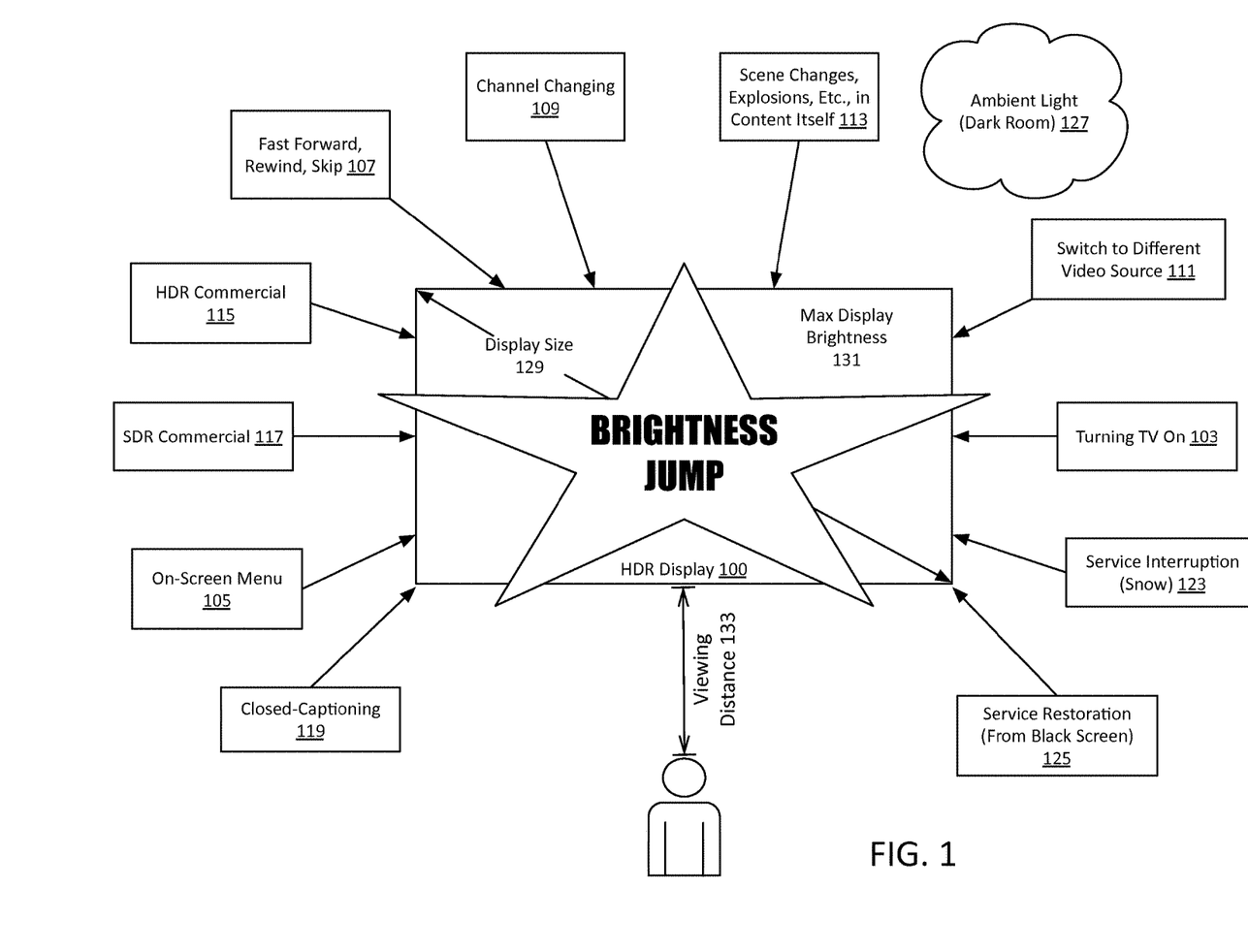
FIG. 1 illustrates some potential causes of brightness jumps that may affect user comfort when viewing an HDR display.

In fact, in today's world of standard dynamic range (SDR) displays, it may not be well-appreciated that even a seemingly innocuous action such as turning on the television or changing channels may cause an uncomfortable jump in brightness on an HDR display. FIG. 1 illustrates some potential causes of brightness jumps that may affect user comfort when viewing an HDR display 100. For example, jumps in brightness can be caused by user actions, such as turning on the HDR display 103, which may cause a bright on-screen startup menu to be displayed or may immediately display a bright scene of a TV program on the channel to which the HDR display is tuned. Another brightness jump may occur when a user accesses a bright on-screen menu 105 while watching a dark movie. Rewinding, fast-forwarding, and skipping through content 107, as well as channel changing 109 may also result brightness jumps and may increase the frequency of the jumps. Jumps may also be caused by switching among different video sources 111. For example, a user may be watching a television program and then decide to switch the display to surf the Internet, which may result in a brightness jump from a dark scene in the TV program to a mostly white Internet webpage. With an increasing number of content sources (e.g., content providers, Internet websites, cable channels, video games, broadcast networks, DVD/BlueRay™ video streaming services, etc.), switching among the multitude of choices may increase the frequency of uncomfortable brightness jumps.

As illustrated in FIG. 1, some brightness jumps can be caused by the content itself. For example, brightness changes within the content 113, e.g., scene changes, view changes, explosions, oncoming headlights, etc., can cause brightness jumps. Commercials inserted into content can cause brightness jumps. TV programs, for example, typically have multiple commercials inserted at regular intervals. Some commercials may be created for display on HDR displays, i.e., HDR commercials 115, and some commercials may be created for display on SDR displays, i.e., SDR commercials 117. While bright HDR commercials displayed on HDR displays can result in brightness jumps in situations such as discussed above (e.g., bright commercial during dark movie), SDR commercials displayed on HDR displays can result in even more severe jumps in brightness due to the differences in typical luminance value profiles of content created for SDR displays and content created for HDR displays. In particular, when comparing luminance values of an HDR video stream and an SDR video stream of the same scene, the luminance values of HDR stream typically will be much lower than the luminance values of the SDR stream. Because an HDR display can output much more brightness than an SDR display, lower luminance values displayed on an HDR display appear to be the same brightness as higher luminance values displayed on an SDR display. As a result, displaying SDR content (which contains higher luminance values than HDR content of the same scene) on an HDR display can result in an extremely bright displayed scene.

Brightness jumps can also be caused by elements that are overlaid on the content. For example, closed captioning 119 may use thick, white lettering that may cause an uncomfortable brightness jump when a lot of text is displayed during a dark scene. On-screen menus 105 that are popped up during dark scenes may cause uncomfortable jumps in brightness, as discussed above. Other overlaid elements, such as picture-in-picture elements, on-screen notifications, etc., may also cause jumps in brightness. Service interruptions can also result in brightness jumps, such as when a dark scene suddenly turns to snow 123 (i.e., noise), or when a service interruption results in a black screen and the service is restored 125 to display a bright scene of the content.

FIG. 1 also illustrates some factors that can affect the severity of the discomfort resulting from brightness jumps on HDR display 100. For example, ambient light level 127 may affect the severity of user discomfort. Brightness jumps in low ambient lighting conditions may result in greater user discomfort because the user's eyes may be adjusted to a lower overall brightness when the brightness jump occurs. In other words, the jump in total viewed brightness (i.e., ambient brightness combined with HDR display brightness) may be more severe in the case that the HDR display brightness jump occurs in a dimly lit room rather than in a brightly lit room. The size of the HDR display 129, the maximum brightness 131 of the HDR display, and the viewing distance 133 of the user may also affect the severity of user discomfort resulting from brightness jumps.

In sum, as HDR displays become commonplace, the typical user may find that the HDR viewing experience includes a bombardment of brightness jumps that are made worse by very things the user does to enhance the viewing experience, e.g., turning down the lights, buying a bigger TV, sitting closer, etc.

In light of the foregoing, various embodiments are disclosed for controlling brightness jumps by managing the luminance of a video stream prior to displaying the stream on an HDR display.

Figure 2:
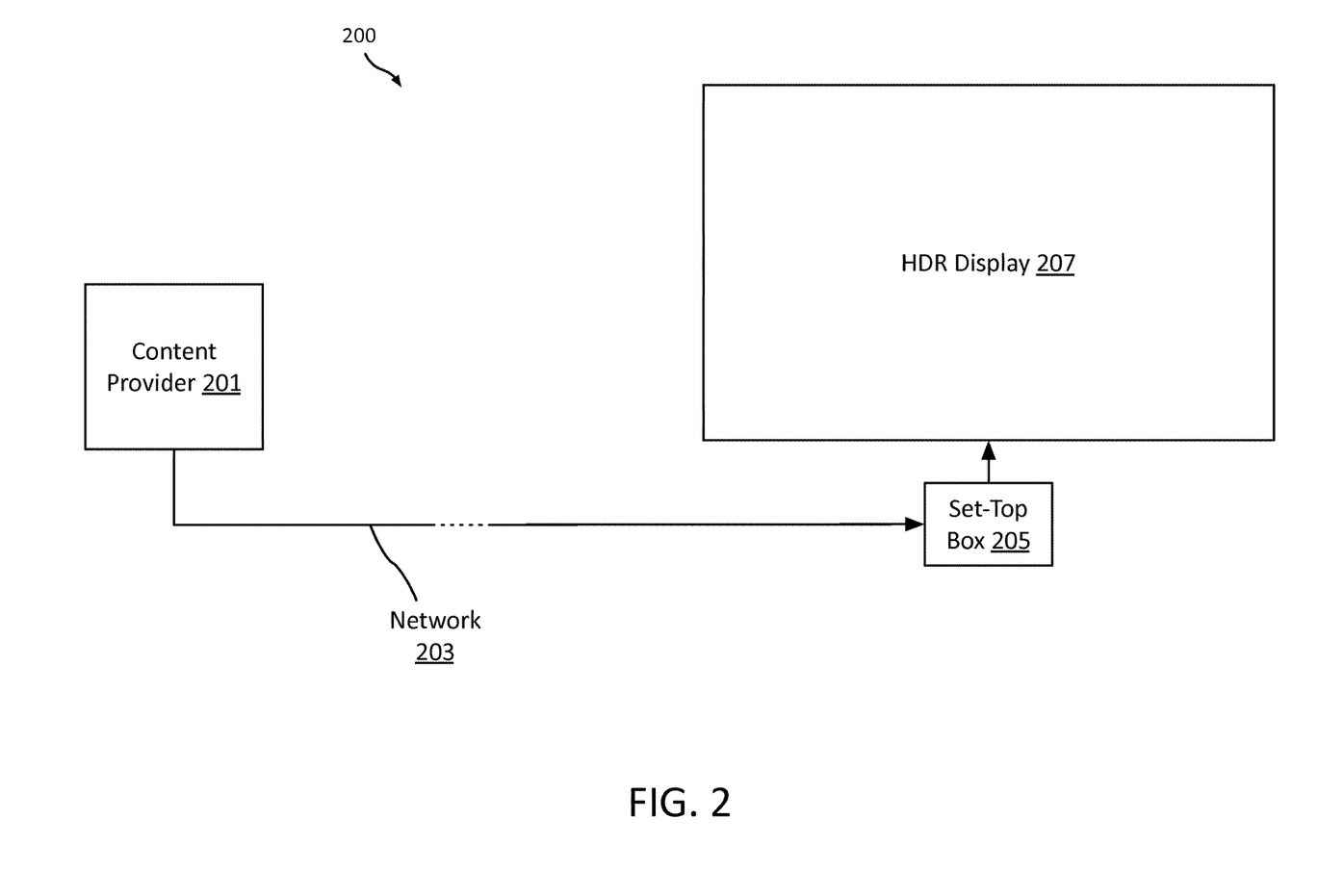
FIG. 2 illustrates an example of a system in which luminance management may be implemented according to various embodiments.
Figure 3:
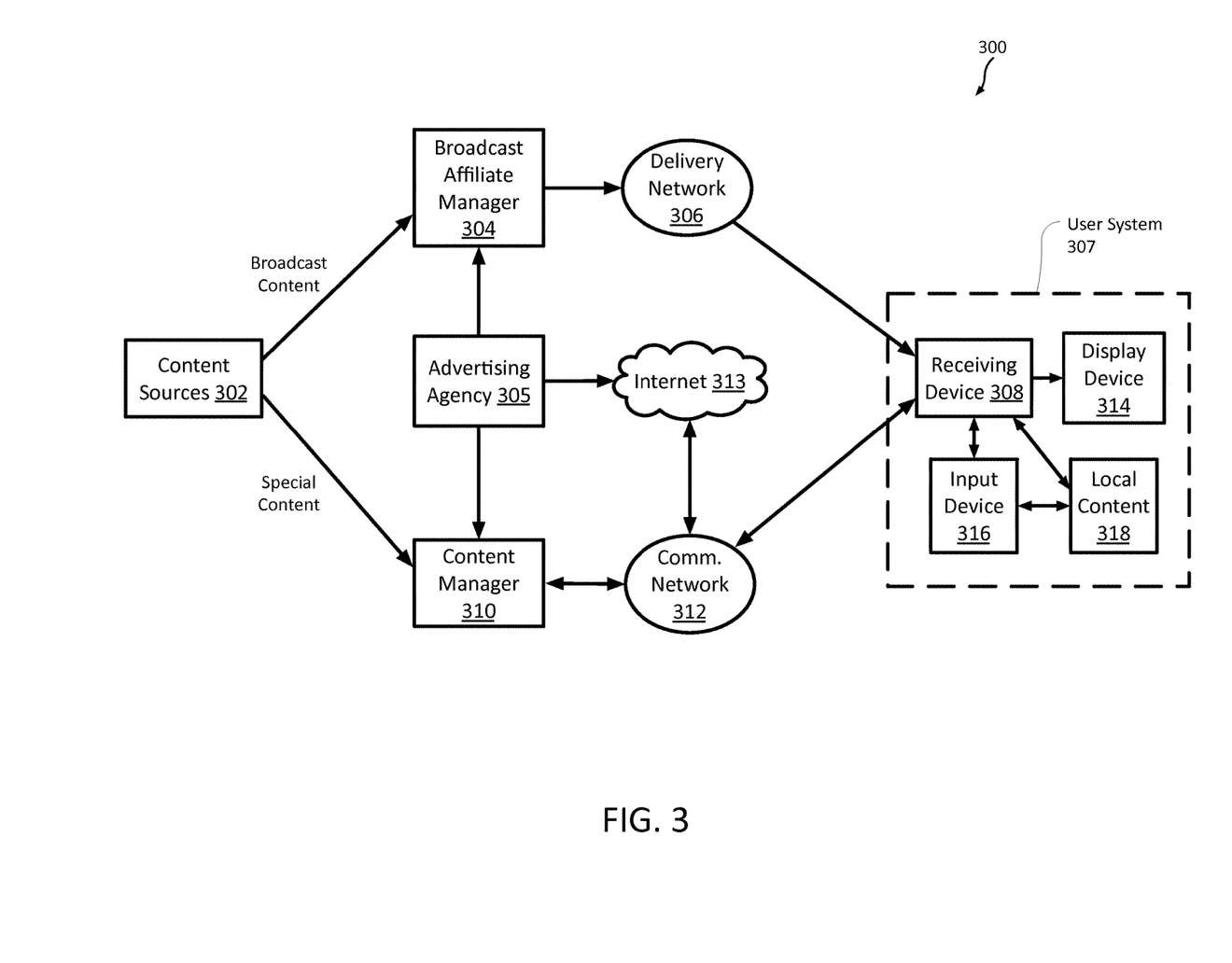
FIG. 3 is a block diagram of an example of a system in which luminance management may be implemented according to various embodiments.
Figure 4:
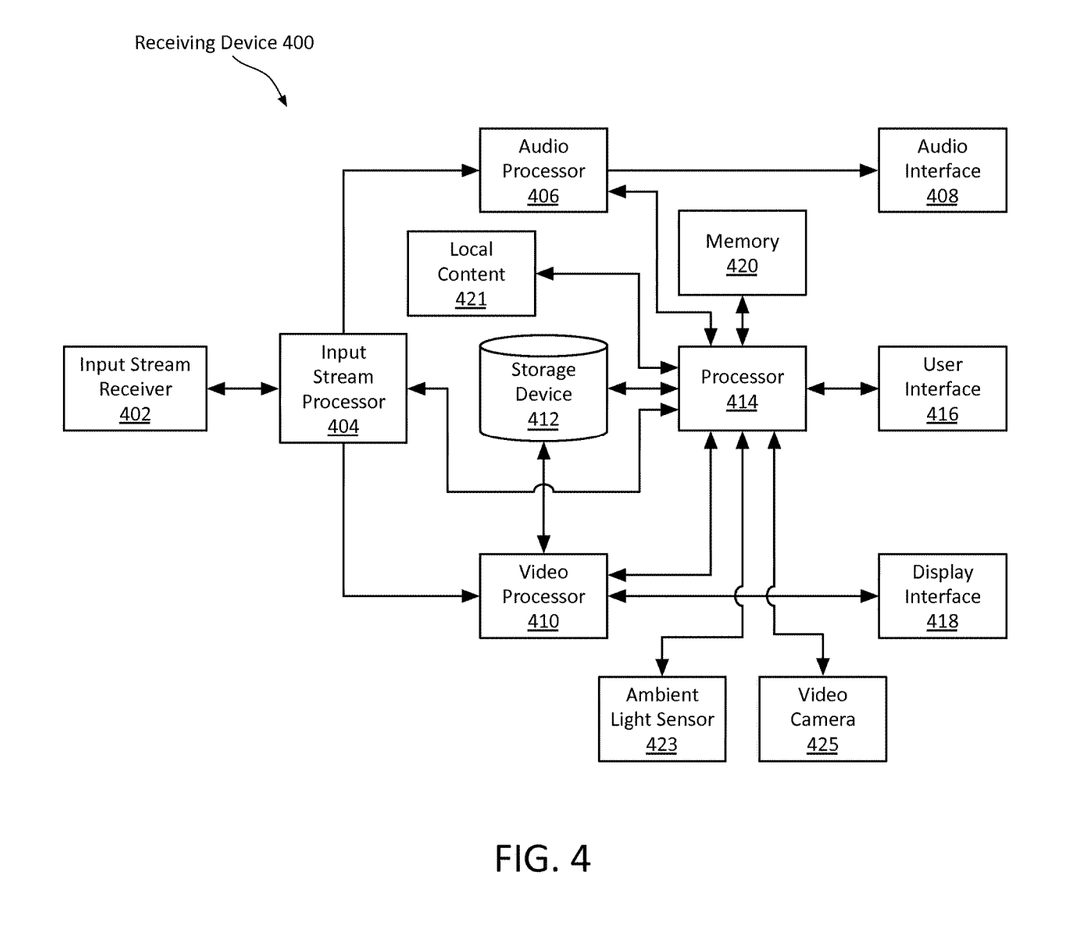
FIG. 4 is a block diagram of an example of a computing system, such as a set-top box/digital video recorder (DVR), gateway, etc., that can include luminance management according to various embodiments.

In various embodiments, luminance management can be implemented in a display device, such as an HDR television, in a set-top box, in a delivery system of a content provider, etc. FIGS. 2-4 illustrate examples of implementations in which luminance management can be provided. It should be understood that various embodiments can include, for example, systems built into consumer products such as gateways, set-top boxes, display devices, etc., and that various embodiments can be implemented in software applications that can be executed on personal computers, smart phones, etc.

FIG. 2 illustrates an example of a system 200 in which various embodiments can be implemented. System 200 includes a content provider 201 that provides content, such as movies, television, etc., via a network 203. Content provider 201 and network 203 can be, for example, a broadcast provider and broadcast network, an internet content provider and the Internet, a cable company and cable network, etc. The content can be delivered to a set-top box 205 connected to an HDR display 207. In various embodiments, luminance management can be implemented by the content provider. In this case, the user's devices, e.g., the set-top box and the HDR display, do not need to have the functionality built in. In various embodiments, luminance management can be implemented by the set-top box or the HDR display, for example. In this case, luminance management can utilize additional information, such as the characteristics of the HDR display (e.g., maximum brightness output) and ambient brightness level. In various embodiments, the HDR display can implement the functionality of the set-top box without the need for the set-top box, as one skilled in the art would readily understand.

FIG. 3 illustrates a more detailed block diagram of an example of a system 300 for delivering content to a home or end user. As described below, luminance management can be implemented by one or more elements of system 300 according to various embodiments.

The content can originate from one or more content sources 302, such as movie studios, TV studios, production houses, home movies uploaded to the Internet, etc. The content may be delivered to the user by various methods. For example, one method of distribution may be a broadcast form of content. The broadcast content can be provided to a broadcast affiliate manager 304, which may be a national broadcast service, such as the American Broadcasting Company (ABC), National Broadcasting Company (NBC), Columbia Broadcasting System (CBS), etc. Broadcast affiliate manager 304 can receive advertisements, such as commercials, from an advertising agency 305, and insert the commercials into content. The broadcast affiliate manager may collect and store the content, and may schedule delivery of the content over a delivery network, shown as delivery network 306. Delivery network 306 may include satellite link transmission from a national center to one or more regional or local centers. Delivery network 306 may also include local content delivery using local delivery systems such as over the air broadcast, satellite broadcast, or cable broadcast. In various embodiments, luminance management may be implemented by broadcast affiliate manager 304, by the one or more regional or local centers of delivery network 306, etc.

A second form of content may be referred to as special content. Special content may include, for example, premium viewing content, pay-per-view content, content provided on the Internet, other content otherwise not provided to the broadcast affiliate manager, e.g., streamed content, webpages, other video elements, etc. The special content may be content requested by the user, such as a webpage, a movie download, etc. The special content may be delivered to a content manager 310. Content manager 310 may receive advertisements, such as commercials, from advertising agency 305 and insert the advertisements into content. The content manager 310 may be a service provider, such as an Internet website, affiliated, for instance, with a content provider, broadcast service, or delivery network service. The content manager 310 may also incorporate Internet content into the delivery system. The content manager 310 may deliver the content to the user's receiving device 308 over a communication network, e.g., communication network 312. Communication network 312 may include high-speed broadband Internet type communications systems. In various embodiments, the user may obtain content, such as movie clips (which may include commercials inserted by advertising agency 305), etc., directly from the Internet 313 via communication network 312 without necessarily having the content managed by the content manager 310. In various embodiments, luminance management may be implemented by content manager 310, Internet website owners that offer content, etc.

Broadcast content and special content can be delivered to a user system 307 through delivery network 306 and communication network 312. For example, user system 307 can include a receiving device 308 that receives and processes broadcast and special content and performs other functions described in more detail below. It is to be appreciated that receiving device 308 can be, for example, a set-top box, a digital video recorder (DVR), a gateway, a modem, a smart TV, a tablet computer, a smartphone, etc. Receiving device 308 may act as entry point, or gateway, for a home network system that includes additional devices configured as either client or peer devices in the home network. In various embodiments, luminance management may be implemented by user system 307.

User system 307 can also include an HDR display device 314. In some embodiments, display device 314 can be an external display connected to receiving device 308. In some embodiments, receiving device 308 and display device 314 can be parts of a single device. User system 307 can also include one or more local content sources 318, such as a DVD player, video game console, personal computer, etc. Display of content from local content sources 318 may be managed by receiving device 308. User system 307 can also include an input device 316, such as a remote controller, a keyboard, a mouse, a touch panel, a touch screen, etc. The input device 316 may be adapted to provide user control for receiving device 308, local content sources 318, and display device 314. In some embodiments, input device 316 may be an external device that can couple to receiving device 308 via, for example, a wired connection, a signal transmission system, such as infra-red (IR), radio frequency (RF) communications, etc., and may include standard protocols such as universal serial bus (USB), infra-red data association (IRDA) standard, Wi-Fi, Bluetooth and the like, proprietary protocols, etc. In some embodiments, receiving device 308 and input device 316 can be part of the same device.

The receiving device 308 may receive different types of content from one or both of delivery network 306 and communication network 312. The receiving device 308 processes the content for display on HDR display device 314. The receiving device 308 may also include a storage device, such as a hard drive or optical disk drive, for recording and playing back audio and video content. Local content sources 318 can process local content, such as DVD movies, video games, etc., for display on HDR display device 314. Further details of the operation of receiving device 308 and features associated with luminance management of content according to various embodiments will now be described in relation to FIG. 4.

FIG. 4 is a block diagram of an example of a computing system configured as a receiving device 400, in which various embodiments for managing luminance can be implemented. Receiving device 400 may operate similar to receiving device 308 described in FIG. 3 and may be included as part of a gateway device, modem, set-top box, personal computer, television, tablet computer, smartphone, etc. Receiving device 400 may also be incorporated with other systems, including an audio device or a display device. The receiving device 400 may be, for example, a set top box coupled to an external display device (e.g., an HDR television), a personal computer coupled to a display device (e.g., a computer monitor), etc. In some embodiments, the receiving device 400 may include an integrated display device, for example, a portable device such as a tablet computer, a smartphone, etc. Although luminance management is described herein using the example of a receiving device, one skilled in the art will understand that various embodiments of luminance management can be implemented, for example, by a content provider, transmission network, etc., prior to the delivery of a video stream.

In receiving device 400 shown in FIG. 4, the content is received by an input stream receiver 402. The input stream receiver 402 may include, for example, receiver circuits used for receiving, demodulation, and decoding streams provided over one of the several possible networks including over the air, cable, satellite, Ethernet, fiber and phone line networks. The desired input stream may be selected based on user input provided through a user interface 416. For example, the user input may include selecting a channel, and the input stream received by input stream receiver 402 may include HDR content interspersed with SDR commercials. In various embodiments, user interface 416 can be used to access an on-screen menu, picture-in-picture, etc. The on-screen menu may cover the entire viewing area, for example, replacing the viewed content, or the on-screen menu may cover part of the viewing area, so that some of the viewed content remains viewable. User interface 416 can be coupled to an input device, such as input device 316, and can receive and process corresponding user inputs, for example, keystrokes, button presses, touch inputs, such as gestures, audio input, such as voice input, etc., from the input device. User interface 416 may be adapted to interface to a cellular phone, a tablet, a mouse, a remote controller, etc.

The decoded output stream is provided to an input stream processor 404. The input stream processor 404 performs the final stream selection and processing, and includes separation of video content from audio content for the content stream. The audio content is provided to an audio processor 406 for conversion from the received format, such as a compressed digital signal, to an analog waveform signal. The analog waveform signal is provided to an audio interface 408 and further to the display device or audio amplifier.

The video output from the input stream processor 404 is provided to a video processor 410. The video stream may be one of several formats such as RGB, YUV, etc. Furthermore, the electro-optic transfer function (EOTF) used to encode the video stream may also be one of several methods such as gamma encoding, perceptual quantizer (PQ) encoding, etc. If the video stream is in a format that has an independent luminance channel, such as YUV, luminance values of the pixels of each frame can be determined directly from the luminance channel. If the video stream is in a format that does not have an independent luminance channel, such as RGB, luminance values can be calculated as a function of the color channel values. Video processor 410 provides, as necessary, a conversion of the video content, based on the input stream format. Video processor 410 also performs any necessary conversion for the storage of the video streams. A processor 414 can control the operation of video processor 410, and can manage the luminance of the video stream in accordance with various embodiments described herein.

A storage device 412 can store audio and video content received at the input. The storage device 412 can allow later retrieval and playback of the content under the control of processor 414 and also based on commands, e.g., navigation instructions such as fast-forward (FF) and rewind (RW), received from user interface 416. Storage device 412 may store instructions for processor 414, including instructions for performing luminance management. Storage device 412 may also store data that can be used for luminance management, for example, HDR display characteristics (such as the size of the HDR display connected to receiving device 400, the maximum brightness of the HDR display, a gamma value associated with the HDR display, a user-adjusted brightness setting of the HDR display, etc.), environmental data (such as a brightness value of the ambient light in the room, a viewing distance of the user from the HDR display, etc.), and other data according to various embodiments. The storage device 412 may be, for example, a hard disk drive, one or more large capacity integrated electronic memories, such as static RAM (SRAM), or dynamic RAM (DRAM), an interchangeable optical disk storage system such as a compact disk (CD) drive or digital video disk (DVD) drive, etc.

The luminance of the converted video stream can be managed according to various embodiments and can be provided to the display interface 418. The display interface 418 can provide the display signal to an HDR display device, such as display device 314, described above. The processor 414 is interconnected via a bus to several of the components of the device 400, including the input stream processor 404, audio processor 406, video processor 410, storage device 412, user interface 416, one or more local content sources 421, an ambient light sensor 420, and a video camera 425. The processor 414 manages the conversion process for converting the input stream for storage on the storage device or for display on an HDR display. Processor 414 can receive local content from local content sources 421, such as a DVD player, video game console, personal computer, etc., and process the local content for display on an HDR display. Processor 414 also manages the retrieval and playback of stored content. Processor 414 can perform other functions, such as generating on-screen menus, closed captioning, picture-in-picture elements, etc. Processor 414 can also provide rewind, fast-forward, and skipping functionality for various viewed content, and allow the user to switch among various content sources. Processor 414 can receive ambient light information from an ambient light sensor 423. Video camera 425 can be, for example, built into the front of an HDR display, and can provide processor 414 with a camera view from the front of the HDR display. Processor 414 can process the camera view to obtain additional information, for example to determine the viewing distance of a user viewing the HDR display. Furthermore, as will be described in more detail below, processor 414 can perform luminance management of broadcast content, special content, and local content according to various embodiments.

The processor 414 can be connected to memory 420 (e.g., volatile or nonvolatile memory, including RAM, SRAM, DRAM, ROM, programmable ROM (PROM), flash memory, electronically programmable ROM (EPROM), electronically erasable programmable ROM (EEPROM), etc.) for storing information and instruction code for processor 414. Memory 420 may store instructions for processor 414, including instructions for performing luminance management according to various embodiments. Memory 420 may also store a database of elements, such as graphic elements containing content. The database may be stored as a pattern of graphic elements, such as graphic elements containing content, various graphic elements used for generating a displayable user interface, such as an on-screen menu, for display interface 418, and the like. In some embodiments, the memory may store the graphic elements in identified or grouped memory locations and use an access or location table to identify the memory locations for the various portions of information related to the graphic elements. Memory 420 can store HDR display information, such as the size of the HDR display and the maximum brightness of the HDR display. Further, the implementation of the memory 420 may include several possible embodiments, such as a single memory device, more than one memory circuit communicatively connected or coupled together to form a shared or common memory, etc. Still further, the memory may be included with other circuitry, such as portions of bus communications circuitry, in a larger circuit.

Figure 5:
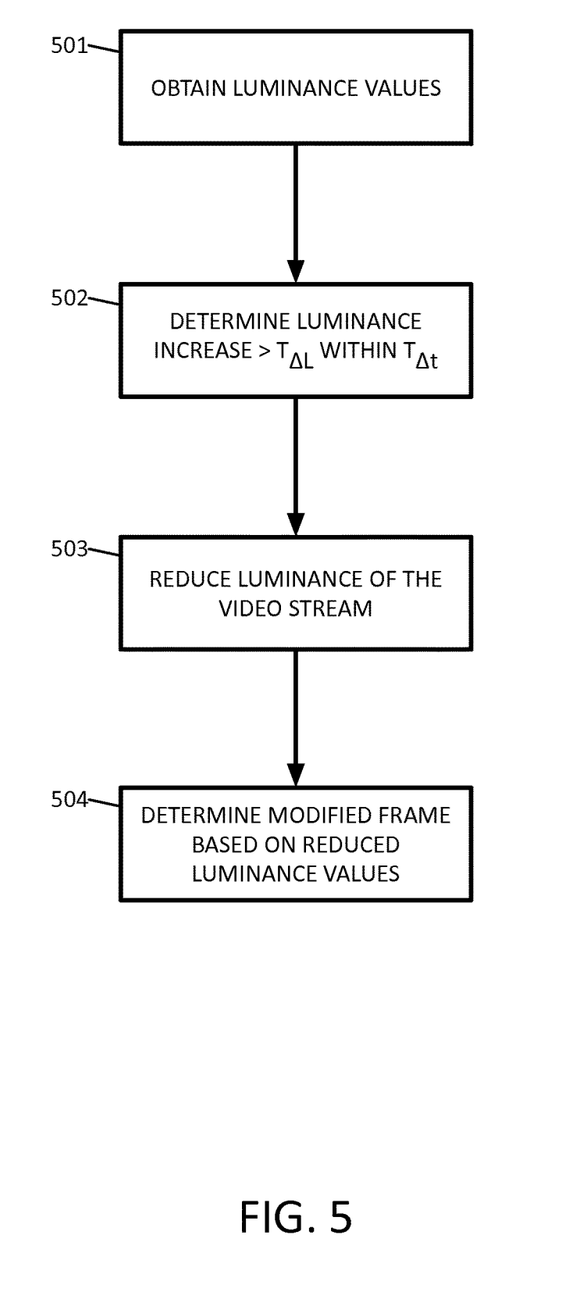
FIG. 5 is a flowchart of an example of a method of managing luminance for HDR display according to various embodiments.
Figure 6:
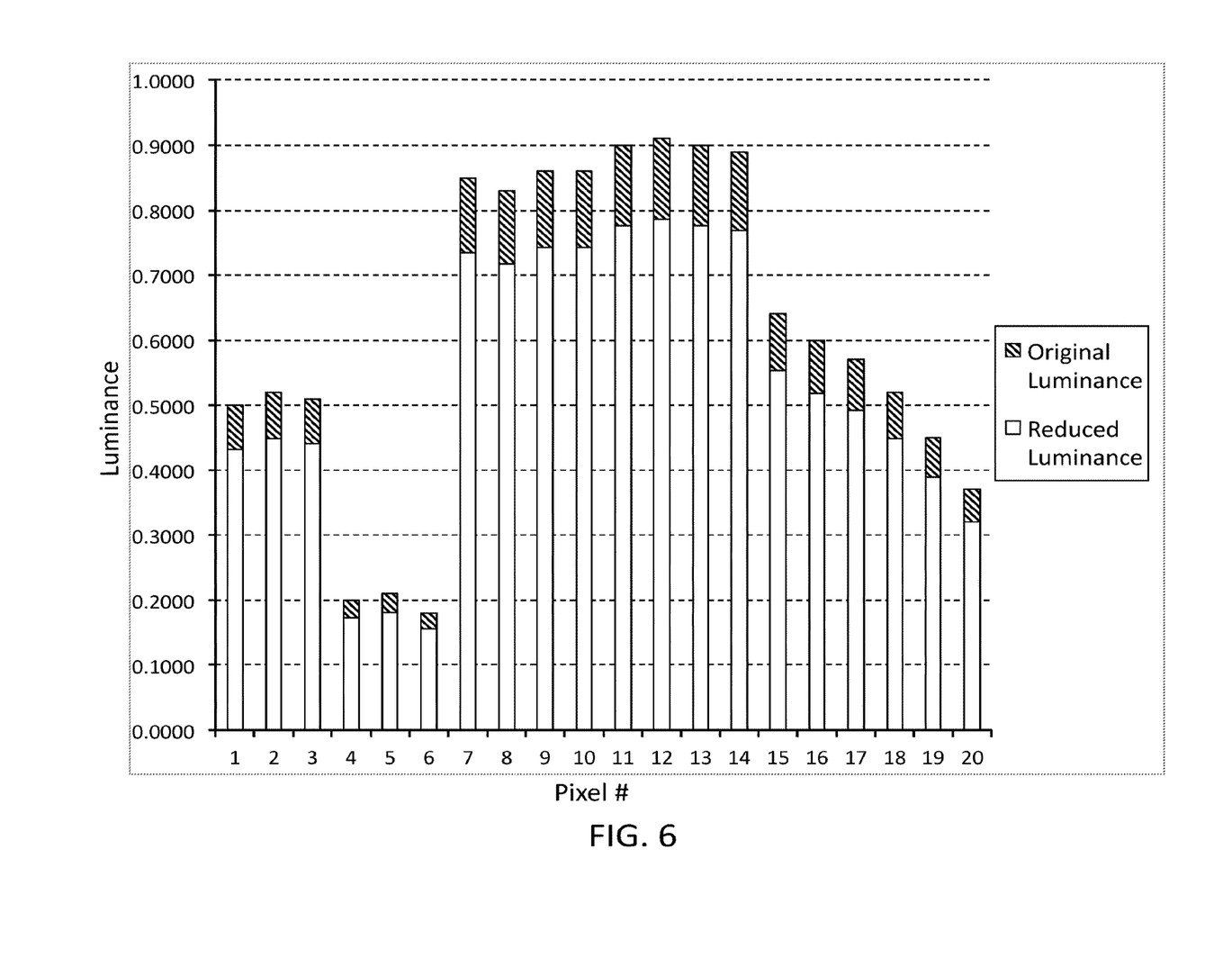
FIG. 6 illustrates a detailed example of reducing luminance according to various embodiments.
Figure 7:
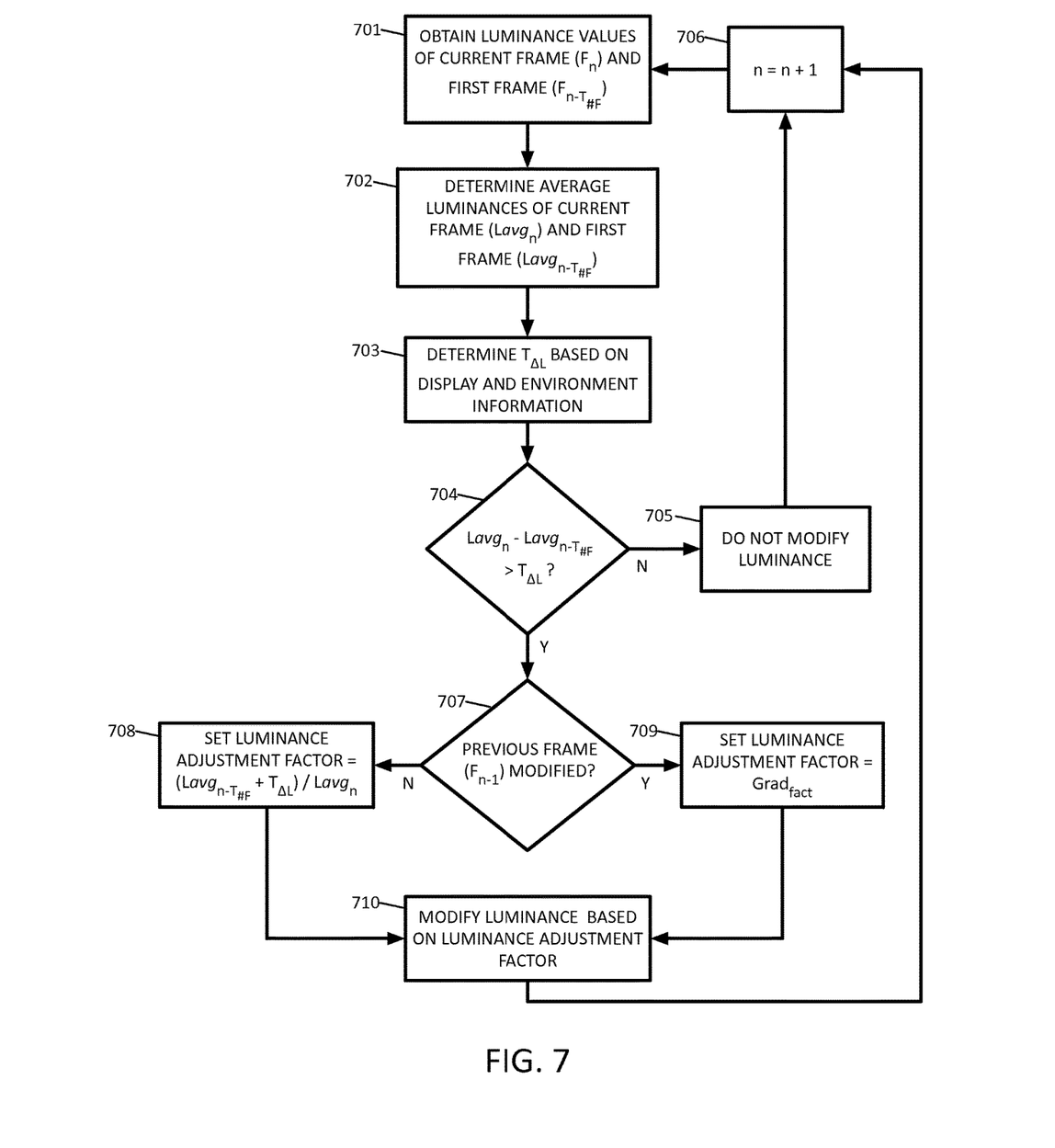
FIG. 7 is a flowchart of another example of a method of luminance management according to various embodiments.

FIGS. 5-7 illustrate examples of luminance management according to various embodiments. It should be noted that the following examples are described using luminance that is measured on a scale of zero (0) to one (1), as in video streams in the Y'UV format, for example. However, one skilled in the art will readily understand that other formats having different ranges for luminance values can be used.

FIG. 5 is a flowchart of an example of a method of managing luminance for HDR display according to various embodiments. The luminance values of the frames of a video stream can be obtained (501), and a luminance increase in the video stream can be determined (502) if a luminance of a current frame is greater than a given luminance change (i.e., a delta luminance, TAL) when compared to a luminance of one or more previous frames in the stream within a window of time (i.e., a delta time, $T_{\Delta t}$) before the current frame. In various embodiments, the time window or period can be based on an average response time for the human eye, that is, the average time for the iris to constrict when exposed to a brightness jump. In various embodiments a brightness jump can be determined based on an increase in an average luminance ($L_{avg}$) of the video stream that exceeds a given average luminance change ($T_{\Delta Lavg}$) within the time window, $T_{\Delta t}$. For example, luminance changes can be determined based on a comparison between a frame at the beginning of the time window, referred to herein as the first frame, and a frame at the end of the time window, i.e., the current frame. For example, if the difference between $L_{avg}$ of the current frame and $L_{avg}$ of the first frame exceeds $T_{\Delta Lavg}$, a brightness jump can be determined, and the current frame can be referred to as an over-bright frame. For example, an average luminance increase greater than 0.5 within a time window of 1.0 second might be considered an unacceptable brightness jump on an HDR display.

In various embodiments, the given luminance change may be based on HDR display characteristics, such as maximum brightness, screen size, a user-adjustable brightness setting, a gamma value, etc. For example, the given luminance change of a first HDR display with a large screen size and an exceptional maximum brightness might be set to 0.4, while the given luminance change of a second HDR display with a smaller screen size and an average maximum brightness might be set to 0.5. Weighting the given luminance change in this way, i.e., based on factors such as screen size and maximum brightness, may allow for more consistent results in luminance management because, for example, a 0.4 luminance increase in a video stream displayed on the first HDR display may produce the same brightness increase as a 0.5 luminance increase in a video stream displayed on the second HDR display. In other words, an increase in the luminance values of a video stream displayed on larger and more powerful HDR display can cause a larger jump in brightness, i.e., the actual amount of light output by the display than when the same video stream is displayed on a smaller and less powerful HDR display. Therefore, the given luminance change associated with the larger, more powerful display may be set to a lower value than the given luminance change of the smaller, less powerful display, so that brightness jumps on both display are limited to the same amount.

In various embodiments, determining the given luminance change may be include determining a total viewable brightness increase that is based on, for example, a brightness increase within the total field of view of the user. For example, a center-weighted average brightness increase can be calculated based on factors such as the viewing distance of the user, the screen size and max display brightness, and the brightness of ambient light. In this regard, for example, if the first HDR display described above is in a dimly lit room with the user sitting close to the screen, the given luminance change might be reduced to 0.3. Similarly, if the first HDR display is in a brightly lit room with the user sitting far from the screen, the given luminance change might be increased to 0.5.

When a brightness jump exceeding the given parameters is detected, the luminance values of the over-bright frame can be reduced (503). In various embodiments, luminance values can be reduced based on the given luminance change itself, for example, by reducing the luminance values of the over-bright frame such that the change in the luminance is brought below the given value. In various embodiments, the reduction in the luminance values can be applied such that the relative luminances among pixels is maintained. For example, adding the given luminance change to the luminance of the first frame can give a maximum acceptable luminance of the over-bright frame. The luminance of the over-bright frame can be reduced based on a luminance adjustment factor (LAF) that can be determined based the ratio of the maximum acceptable luminance and the actual luminance of the over-bright frame. The luminance value of each pixel in the over-bright frame can be modified based on the luminance adjustment factor. Table 1 and FIG. 6 illustrate a more detailed example.

For the purpose of illustration, only 20 pixels of a video frame are shown in Table 1 and FIG. 6. However, it should be understood that the example applies to all pixels in a frame. Table 1 shows sample calculations for creating a modified frame by reducing the luminance values of an over-bright frame such that the change in the average luminance is brought below the given value, and the luminance values of the modified frame maintain the same relative luminances among pixels. The first column of Table 1 shows pixel numbers (1-20) of the frame, and the second column shows the luminance values of each of pixel, and these luminance values are illustrated by the taller columns of the graph shown in FIG. 6. In this example, the given average luminance change is 0.4, and the first frame has an average luminance of 0.13. Therefore, the maximum acceptable average luminance of the current frame is 0.4+ 0.13=0.53. However, the average luminance of the current frame is 0.6135, which exceeds the maximum acceptable average luminance of 0.53. Therefore, the current frame is an over-bright frame.

TABLE 1

Luminance Reduction Example

| Pixel | Luminance | Adjusted Luminance |
|---|---|---|
| 1 | 0.5 | 0.4319 |
| 2 | 0.52 | 0.4492 |
| 3 | 0.51 | 0.4406 |
| 4 | 0.2 | 0.1728 |
| 5 | 0.21 | 0.1814 |
| 6 | 0.18 | 0.1555 |
| 7 | 0.85 | 0.7343 |
| 8 | 0.83 | 0.7170 |
| 9 | 0.86 | 0.7430 |
| 10 | 0.86 | 0.7430 |
| 11 | 0.9 | 0.7775 |
| 12 | 0.91 | 0.7861 |
| 13 | 0.9 | 0.7775 |
| 14 | 0.89 | 0.7689 |
| 15 | 0.64 | 0.5529 |
| 16 | 0.6 | 0.5183 |
| 17 | 0.57 | 0.4924 |
| 18 | 0.52 | 0.4492 |
| 19 | 0.45 | 0.3888 |
| 20 | 0.37 | 0.3196 |

To reduce the luminance of the over-bright frame, a luminance adjustment value is calculated as the ratio of the maximum acceptable average luminance of the over-bright frame and the actual average luminance of the over-bright frame, 0.53/0.6135=0.8639. The luminance value of each pixel in the over-bright frame is reduced by multiplying the luminance value by the luminance adjustment value. The second column of Table 1 shows the reduced luminance values, which are illustrated in FIG. 6 by the shorter columns. The average luminance of the adjusted luminance values is 0.53, which is equal to the maximum acceptable average luminance. Accordingly, average luminance of the over-bright frame can be reduced to within the given value. In addition, the relative luminance of the pixels in the current frame is maintained. For example, the relative difference between the unmodified luminance values of pixel 1 and pixel 2 is ABS((0.5−0.52)/0.5))=0.04, or 4%. The relative difference between the modified luminance values of pixel 1 and pixel 2 is ABS((0.4319−0.4492)/0.4319))=0.04, or 4% as well.

Returning now to FIG. 5, a modified frame can be determined (504) from the over-bright frame based on the reduced luminance values. For example, for formats with an independent luminance channel, the luminance values of the over-bright frame can be replaced with the reduced luminance values. For formats that do not have an independent luminance channel, the color channels can be modified such that the color of the pixels remains the same, but the pixel luminances are reduced to the reduced luminance values.

The modified frame can be inserted into the video stream and transmitted to an HDR display to be displayed.

FIG. 7 is a flowchart of another example of a method of luminance management according to various embodiments. In this example, once a luminance jump has been identified and the luminance of the over-bright frame has been reduced, the luminance of subsequent frames can be gradually returned normal levels, i.e., unmodified luminance values. The gradual return normal luminance levels may allow the luminance adjustments to be less noticeable and appear more natural, which can result in a more visually comfortable viewing experience.

It should be noted that in this example, the time window can be represented as a given number of frames ($T_{\#F}$). For example, a time window of 1.0 second corresponds to a $T_{\#F}$ of 32 frames (for a frame rate of 32 frames/sec), i.e., the first frame is the frame that is 32 frames before the current frame in the video stream.

Referring to FIG. 7, luminance values of a current frame ($F_n$) and a first frame ($F_{n-T\#F}$) can be obtained (701). The average luminances of the current frame ($Lavg_n$) and the first frame ($Lavg_{n-T\#F}$) can be determined (702). The given average luminance change, $T_{\Delta L}$, can be determined (703) based on display and environment information. For example, a given luminance change may be weighted based on display characteristics, such as maximum brightness, screen size, a user-adjustable brightness setting, a gamma value, etc., and environment characteristics, such as ambient brightness level, user viewing distance, etc., as described above. The method can determine (704) whether the average luminance change between the current frame and the first frame exceeds the given luminance change ($Lavg_n - Lavg_{n-T\#F} > T_{\Delta L}$).

If the average luminance change does not exceed the given luminance change, the current frame is not modified (705), and a frame counter is incremented (706) to set the next frame in the video stream as the current frame for processing. If the average luminance change exceeds the given average luminance change, the method can determine (707) whether the luminance of a previous frame ($F_{n-1}$), i.e., the frame immediately preceding the current frame in the stream, was modified. In other words, the method can determine whether the current frame is the frame that caused the unacceptable brightness jump or whether the current frame is after the jump. If the luminance of the previous frame was not modified (i.e., the current frame is the frame that caused the unacceptable brightness jump), the luminance adjustment factor can be set (708) to a ratio of the maximum acceptable average luminance and the average luminance of the current frame ($LAF = (Lavg_{n-T\#F} + T_{\Delta L})/Lavg_n$), which is the same adjustment factor described above in the previous embodiment.

If the luminance of the previous frame was modified, the luminance adjustment factor can be set (709) to a gradual adjustment factor ($Grad_{fact}$). For example, $Grad_{fact}$ can equal the luminance adjustment factor of the previous frame ($LAF_{prev}$) that is slightly reduced, for example, by multiplying with a constant that is less than, but close to, 1. For example, $Grad_{fact} = LAF_{prev} * 0.95$. In this way, the luminance adjustment can be reduced slightly for each subsequent frame after a brightness jump. As a result, the luminance adjustments can gradually fade away, i.e., the luminance can gradually transition back to the actual luminance of the content.

After the LAF has been determined, the luminance of the current frame can be modified (710) based on the LAF, and the frame counter can be incremented (706) to set the next frame in the video stream as the current frame.

It should be appreciated by those skilled in the art that the methods described above may be implemented by, for example, a computing system such as a general purpose computer through computer-executable instructions (e.g., software, firmware, etc.) stored on a computer-readable medium (e.g., storage disk, memory, etc.) and executed by a computer processor. Referring to FIG. 4, for example, software implementing one or more methods shown in the flowcharts could be stored in storage device 412 and executed by processor 414. It should be understood that in various embodiments, various elements shown in the figures may be implemented in various forms of hardware, software or combinations thereof. That is, various elements may be implemented in a combination of hardware and software on one or more appropriately programmed general-purpose devices, which may include a processor, memory and input/output interfaces.

It should also be appreciated that although various examples of various embodiments have been shown and described in detail herein, those skilled in the art can readily devise other varied embodiments that still remain within the scope of this disclosure.

All examples and conditional language recited herein are intended for instructional purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It is noted that the use of "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items as listed.

In the claims hereof, any element expressed as a means for performing a specified function is intended to encompass any way of performing that function including, for example, a combination of circuit elements that performs that function, software in any form, including, therefore, firmware, microcode or the like, combined with appropriate circuitry for executing that software to perform the function, etc. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A system comprising:
   a processor; and
   a memory storing instructions configured to cause the processor to:
   obtain characteristics of a HDR display;
   obtain luminance values of a video stream;
   determine a luminance increase if a luminance of a current frame of the video stream exceeds a luminance change when compared to a luminance of a previous frame within a time window;
   reduce the luminance values of the current frame according to said determined luminance increase and to the characteristics of the HDR display; and
   determine a modified frame base on the reduced luminance values.

2. The system of claim 1, wherein the luminance is an average luminance and the increase in the average luminance is determined based on a difference between the average luminance of the frame and the average luminance of a frame at the beginning of the time window.

3. The system of claim 1, wherein the characteristics of the HDR display include at least one of a maximum brightness, a brightness setting, a gamma value, and a screen size.

4. The system of claim 1,
   wherein the instructions further cause the processor to obtain information of an environment of the HDR display, and to determine the luminance change based on the information of the environment.

5. The system of claim 4, wherein the information of the environment includes at least one of an ambient light value and a viewing distance.

6. The system of claim 1, wherein the instructions further cause the processor to reduce the luminance values of subsequent frames in the video stream such that an amount of the reduction of the luminance values decreases.

7. A non-transitory computer-readable medium storing computer-executable instructions executable to perform a method for managing the luminance of a video stream, the method comprising:
   obtaining characteristics of an HDR display;
   obtaining luminance values of the video stream;
   determining a luminance increase if a luminance of a current frame of the video stream exceeds a luminance change when compared to a luminance of a previous frame within a time window;
   reducing the luminance values of the current frame according to said determined luminance increase and to the characteristics of the HDR display; and
   determining a modified frame base on the reduced luminance values.

8. The non-transitory computer-readable medium of claim 7, wherein the luminance is an average luminance and the increase in the average luminance is determined based on a difference between the average luminance of the frame and the average luminance of a frame at the beginning of the time window.

9. The non-transitory computer-readable medium of claim 7, wherein the characteristics of the HDR display include at least one of a maximum brightness, a brightness setting, a gamma value, and a screen size.

10. The non-transitory computer-readable medium of claim 7, wherein the method further comprises:
    obtaining information of an environment of an HDR display; and
    determining the luminance change based on the information of the environment.

11. The non-transitory computer-readable medium of claim 10, wherein the information of the environment includes at least one of an ambient light value and a viewing distance.

12. The non-transitory computer-readable medium of claim 7, wherein the method further comprises:
    reducing the luminance values of subsequent frames in the video stream such that an amount of the reduction of the luminance values decreases.

13. A method for managing the luminance of a video stream, the method comprising:
    obtaining characteristics of an HDR display;
    obtaining luminance values of the video stream;
    determining a luminance increase if a luminance of a current frame of the video stream exceeds a luminance change when compared to a luminance of a previous frame within a time window;
    reducing the luminance values of the current frame according to said determined luminance increase and to the characteristics of the HDR display; and
    determining a modified frame base on the reduced luminance values.

14. The method of claim 13, wherein the luminance is an average luminance and the increase in the average luminance is determined based on a difference between the average luminance of the frame and the average luminance of a frame at the beginning of the time window.

15. The method of claim 13, wherein the characteristics of the HDR display include at least one of a maximum brightness, a brightness setting, a gamma value, and a screen size.

16. The method of claim 13, further comprising:
    obtaining information of an environment of an HDR display; and
    determining the luminance change based on the information of the environment.

17. The method of claim 16, wherein the information of the environment includes at least one of an ambient light value and a viewing distance.

18. The method of claim 13, further comprising:
    reducing the luminance values of subsequent frames in the video stream such that an amount of the reduction of the luminance values decreases.

19. The system of claim 1, wherein said time window is an average time for a human iris to constrict when exposed to a brightness jump corresponding to said luminance change.

20. The non-transitory computer-readable medium of claim 7, wherein said time window is an average time for a human iris to constrict when exposed to a brightness jump corresponding to said luminance change.

21. The method of claim 13, wherein said time window is an average time for a human iris to constrict when exposed to a brightness jump corresponding to said luminance change.

* * * * *